United States Patent [19]

Bryan-Brown

[11] Patent Number: 5,597,732
[45] Date of Patent: Jan. 28, 1997

[54] COMPOSTING APPARATUS

[76] Inventor: Michael Bryan-Brown, Box 17, Whitingham, Vt. 05361

[21] Appl. No.: 421,988

[22] Filed: Apr. 14, 1995

[51] Int. Cl.$^6$ .................................................... C12M 1/04
[52] U.S. Cl. ..................................... 435/290.4; 435/290.1
[58] Field of Search .................................. 435/311, 313, 435/290.1, 290.4; 202/228; 71/11

[56] References Cited

U.S. PATENT DOCUMENTS 4,414,335  11/1983  Kipp, Jr. ................................. 435/313

FOREIGN PATENT DOCUMENTS

| 4113993A | 4/1991 | Germany . |
| 3-028184 | 2/1991 | Japan . |
| 0013819 | 1/1905 | United Kingdom . |

*Primary Examiner*—David A. Redding

[57] ABSTRACT

There is provided an apparatus for composting organic waste in a container with an uneven aeration floor positioned above the bottom of the container. Preferably, the aeration floor slopes down and in from its outer edges to encourage liquid formed during composting to collect under the perforated center portion of the aeration floor. Preferably, the perforated center portion of the aeration floor is arched or peaked. This particular aeration floor configuration directs more air toward the center of the composting mass while minimizing the amount of air following the path of least resistance up the side wall. A chamber is defined by the aeration floor and the bottom of the container. Air enters (or exits) the chamber through an orifice and exits (or enters) the chamber through the perforations in the aeration floor. The container may also have a top wall or cover and a means for exhausting or introducing air through the top of the container. A reversing damper may be used simplify controlling air flow direction. Preferably, the apparatus can be modified to also dewater liquid organic waste before composting.

19 Claims, 9 Drawing Sheets

COMPOSTING APPARATUS

BACKGROUND OF THE INVENTION

1. Field of the Invention

This invention relates to a container for aerobically composting organic waste and, more particularly, to a container that utilizes an uneven aeration floor and reversing air flow direction.

2. Description of the Related Art

Composting is currently used as a method of recycling organic waste into a usable soil additive. As such, composting has been practiced for hundreds of years. However, several operational problems related to existing technology have limited the use of composting. Primarily, most composting apparatuses utilize poorly designed aeration systems that compost inefficiently and require expensive agitation equipment and buildings to prepare and compost the organic waste.

Expensive specialized equipment is usually required to handle and treat the organic waste as it goes through the preparatory stages, such as dewatering and batch mixing, and composting stages. During the preparatory treatment and composting, liquid and gaseous by-products are exposed to the environment causing nuisance odors and water pollution.

Most composting apparatuses use pressurized air to induce the flow of air through the compost. The pressurized air is generally introduced at the base of the compost pile through an air distribution system, such as an aeration floor. Air may be forced into the base of the pile causing an upward flow, or drawn out of the base of the pile causing a downward flow of air in the compost pile. The pressurized air may be activated or deactivated by several means including operator or automatic observation of time, temperature or oxygen levels.

Composting apparatuses generally use flat perforated floors or networks of orafices as the aeration floor. The floors are flat to allow loading equipment such as bucket loaders to remove the composted material from the composting system without obstruction from the floor. Flat perforated floors have major disadvantages. Pressurized air is distributed evenly over the entire surface of the floor. If less resistance is encountered adjacent to the side walls, then the air will "short circuit" up the side walls through the path of least resistance. The organic waste near the side walls will receive more air than the organic waste in the center of the container. The result is inefficient composting.

Figure 5A:
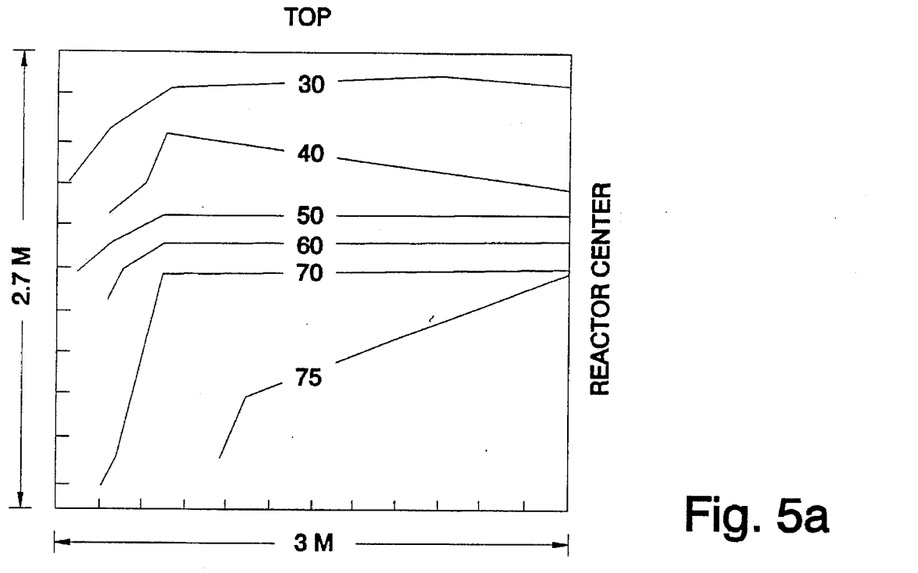
FIG. 5a and 5b shows a typical temperature distribution obtained with negative pressure aeration with a mean temperature of 65.9° C. and a typical temperature distribution obtained with positive pressure aeration with a mean temperature of 54° C.
Figure 5B:
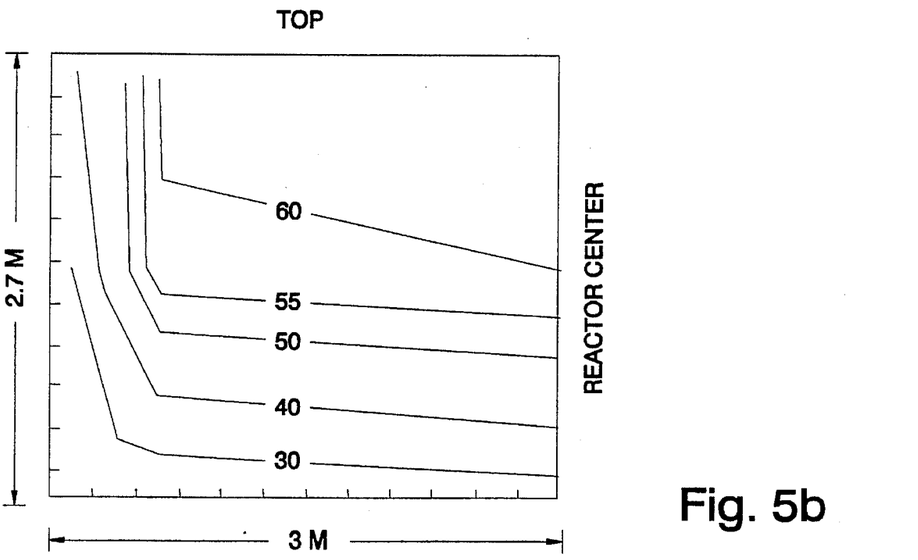

Research has shown that the use of pressurized air to control temperatures and provide oxygen during composting in apparatuses with flat aeration floors creates less than optimal conditions in a portion of the composting material. As shown in FIG. 5, research by Hiotink et all in 1985 showed that temperatures adjacent to the walls of an enclosed composting reactor were lower than temperatures at the center of the compost. In addition to cross-sectional variations in temperature, there were significant vertical variations in temperature based on the direction of air flow through the compost mass. The addition of pressurized air at the base of the compost mass cools the lower portion of the compost by evaporation of moisture in the compost. This evaporated moisture moves through the upper portion of the compost and condenses again releasing heat and moisture in the upper portion of the compost. The net result is the formation of temperature and moisture gradients in the direction of pressurized air flow. The gradients reduce the rate of composting in a portion of the composting material which is not at optimal temperatures or oxygen levels. If the pressurized air continues to move in one direction, the composting waste will remain cool and may dry to the point of ceasing microbial activity. Some systems try to overcome gradients by periodically agitating the composting material to homogenize the compost and thereby eliminate gradients. However, agtiation adds significant cost and complexity to such compost systems.

For the foregoing reasons, there is a need for an apparatus that composts efficiently but does not require relatively expensive agitation and acilllary equipment.

SUMMARY OF THE INVENTION

In the present invention, an apparatus for composting organic waste is taught utilizing a container that composts efficiently without the need for relatively expensive custom agitation and ancillary equipment. This apparatus comprise of a container, an uneven perforated aeration floor and an air passage means. The container has a bottom wall and enclosing walls about the bottom wall. The uneven perforated aeration floor is positioned above the bottom wall for supporting the organic waste and forms a chamber with the enclosing walls and the bottom wall. The first air passage means allows air to be introduced into or exhausted from the chamber.

Advantageously, the aeration floor has a raised perforated center portion and solid outer portions that slope downward from the enclosing walls toward the center of the bottom wall. A top wall is included to completely enclose the container and prevent the escape of undesirable gases. The top wall can be removable. In the presence of the top wall, the container has a second air passage means above the aeration floor to allow air to be exhausted from or introduced into the container. A scoop may be provided within the chamber to collect and decant liquid waste formed during composting.

The direction of air flow through the container can be reversed to further optimize the compost process and eliminate temperature and moisture gradients in the composting waste. The direction of air flow through the first and second air passage means can be reversed by a damper externally connected to the first and second air passage means. Temperature monitoring means are provided within the container to control the flow of air into or out of the first and second air passage means.

Another advantage of the present invention is its ability to dewater liquid organic waste before composting. The container is equipped with attachment means for securing a dewatering system. The dewatering system includes a filter fabric and a drainage net that lines the enclosing walls. The filter fabric is capable of allowing liquid to pass through while retaining the solids portions of the liquid organic waste. The drainage net is interposed between the enclosing walls and the filter fabric to allow liquid passing through the filter fabric to freely drain along the enclosing walls.

These and other features, aspects, and advantages of the present invention will become better understood with regard to the following description, appended claims, and accompanying drawings.

DESCRIPTION

Figure 1:
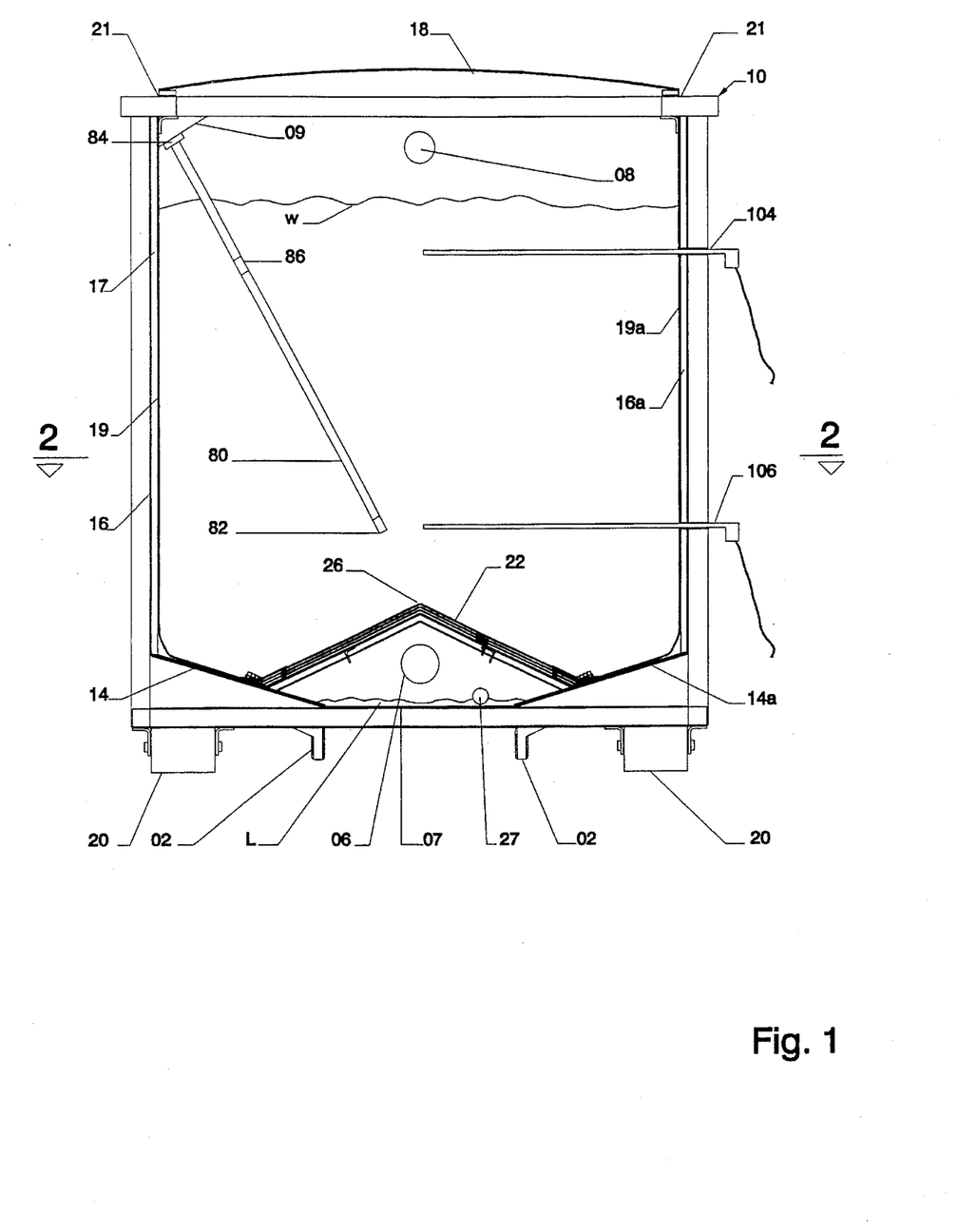
FIG. 1 shows a sectional front view of the container.
Figure 2:
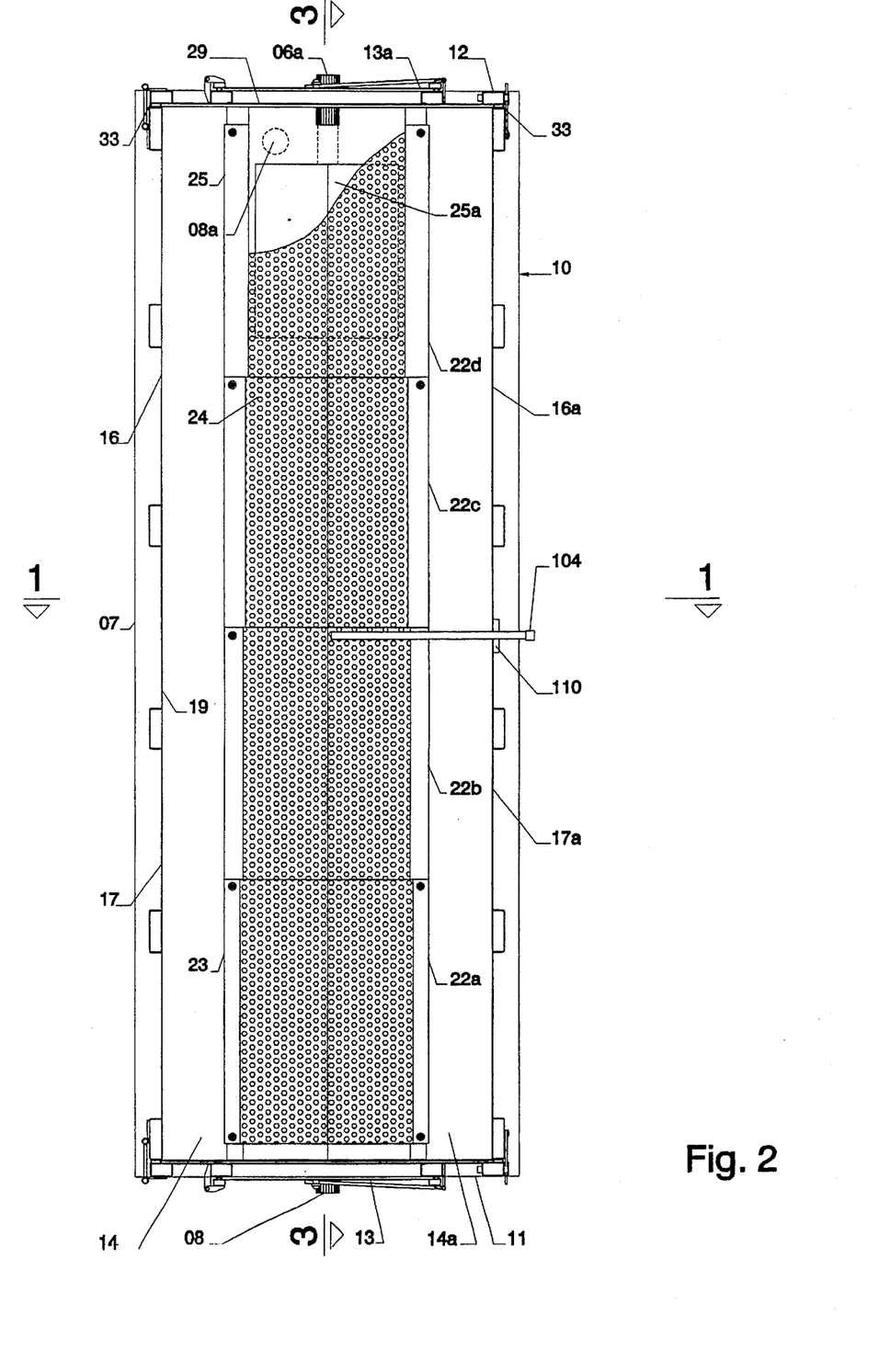
FIG. 2 shows a plan view of the container.
Figure 3:
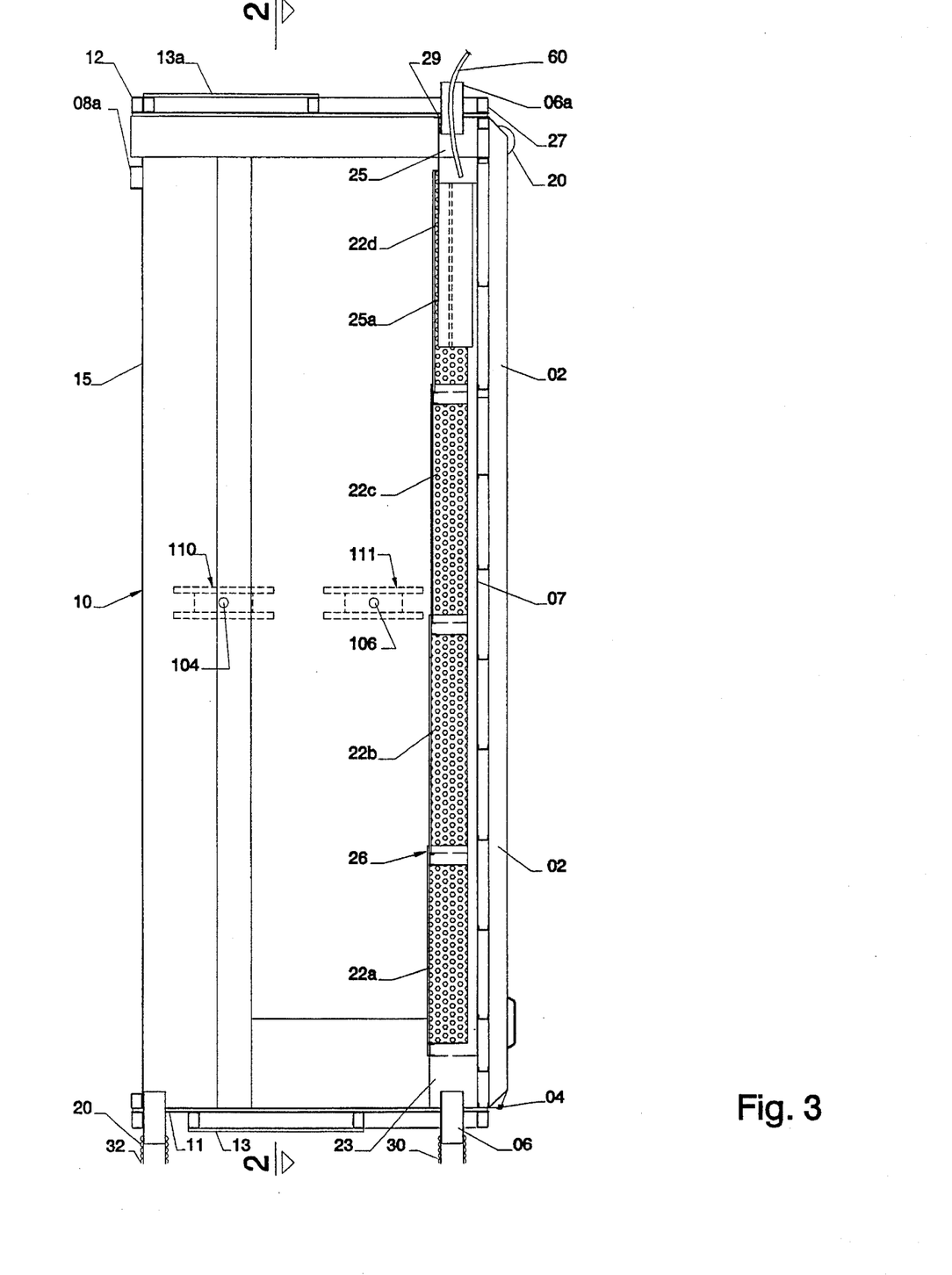
FIG. 3 shows a sectional side view of the container.

The present invention is directed to a composting apparatus and method. As shown in FIGS. 1, 2 & 3, the composting apparatus is comprised of a container 10 for supporting organic waste W, also referred to as composting waste W, undergoing decomposition. The container 10 has a bottom wall 07, enclosing walls about bottom wall 07 and a top wall 15. Enclosing walls are comprised of side walls 16 and 16a, an end wall 11 and a front wall 12. The side walls 16 and 16a are joined to the bottom wall 07, end wall 11, front wall 12 and top wall 15 to form an sealed container. The front wall 12 preferably opens the container 10 to permit discharging or loading of organic waste and is hinged on one side to either of the side walls 16 or 16a and detachably connected to the opposite side wall with suitable locking means, not shown, to form a sealed joint with the side walls 16 and 16a Using gaskets 33. Alternately, front wall 12 can be hinged along top wall 15. The walls are preferably made of inexpensive structural material such as carbon steel, aluminum, fiberglass or plastic.

Figure 4:
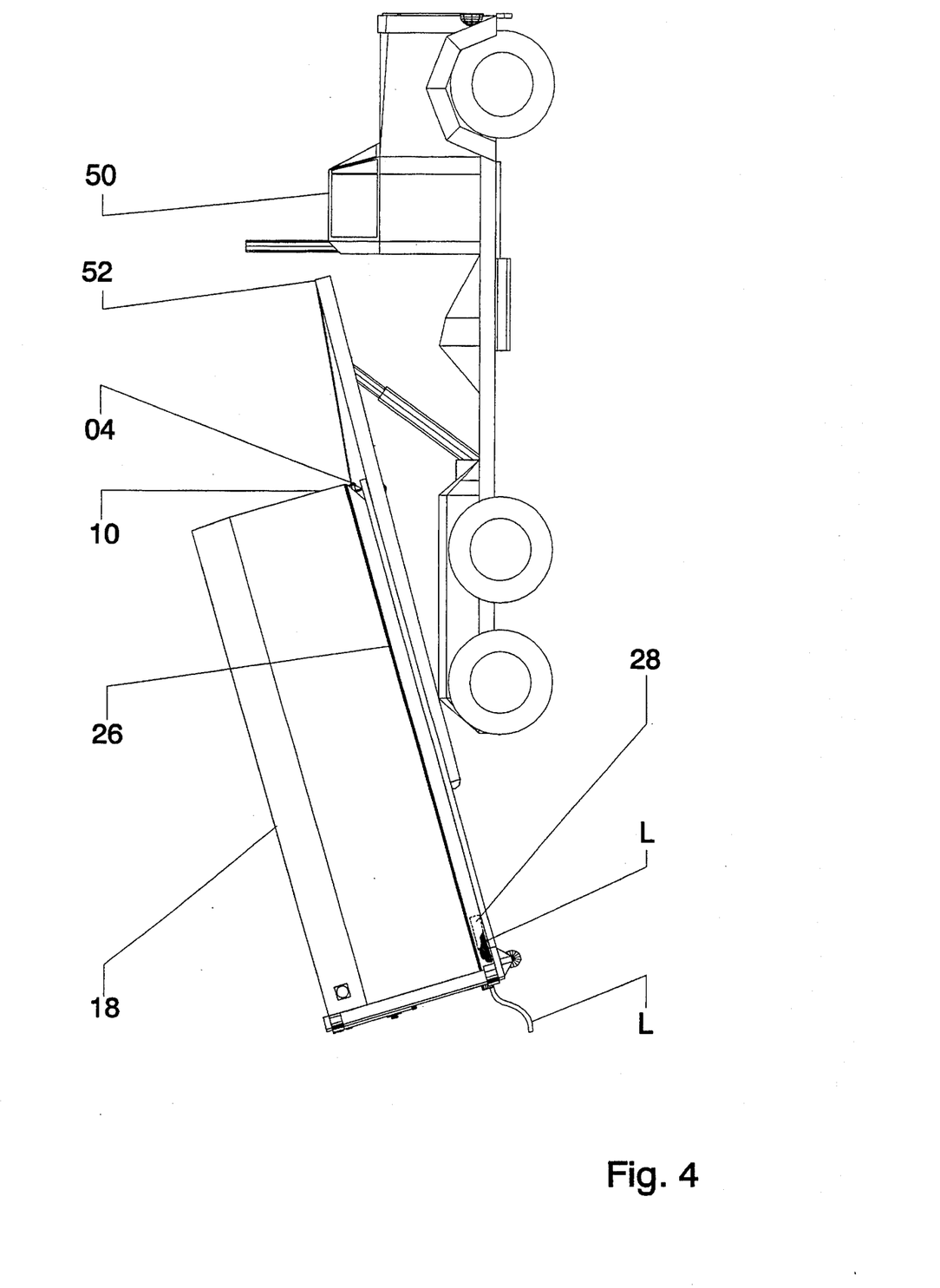
FIG. 4 shows a roll-off truck with a tilted container loader.

The container 10 is preferably transportable and of the roll-off type often identified with waste handling containers capable of rolling on and off trucks, as shown in FIG. 4. The container 10 is mounted atop a plurality of wheels 20, as shown in FIGS. 1 and 2, and has rails 02 attached to the underside of the bottom wall 07 for guiding the container 10 onto the roll-off truck. A hook 04 in the end wall 11 allows the container 10 to be attached to a cable and pulled onto a-tilting frame 52 on the roll-off truck. The container 10 is emptied of composting waste W by tilting frame 52 elevating container 10 to an angle of 45 degrees while locking means not shown for front wall 12 is disconnected. Composting waste W slides past front wall 12 and dumps onto the ground. In another embodiment suitable for larger municipalities, the container 10 has means for being lifted and transported by a fork lift or overhead crane, not shown.

Figure 6:
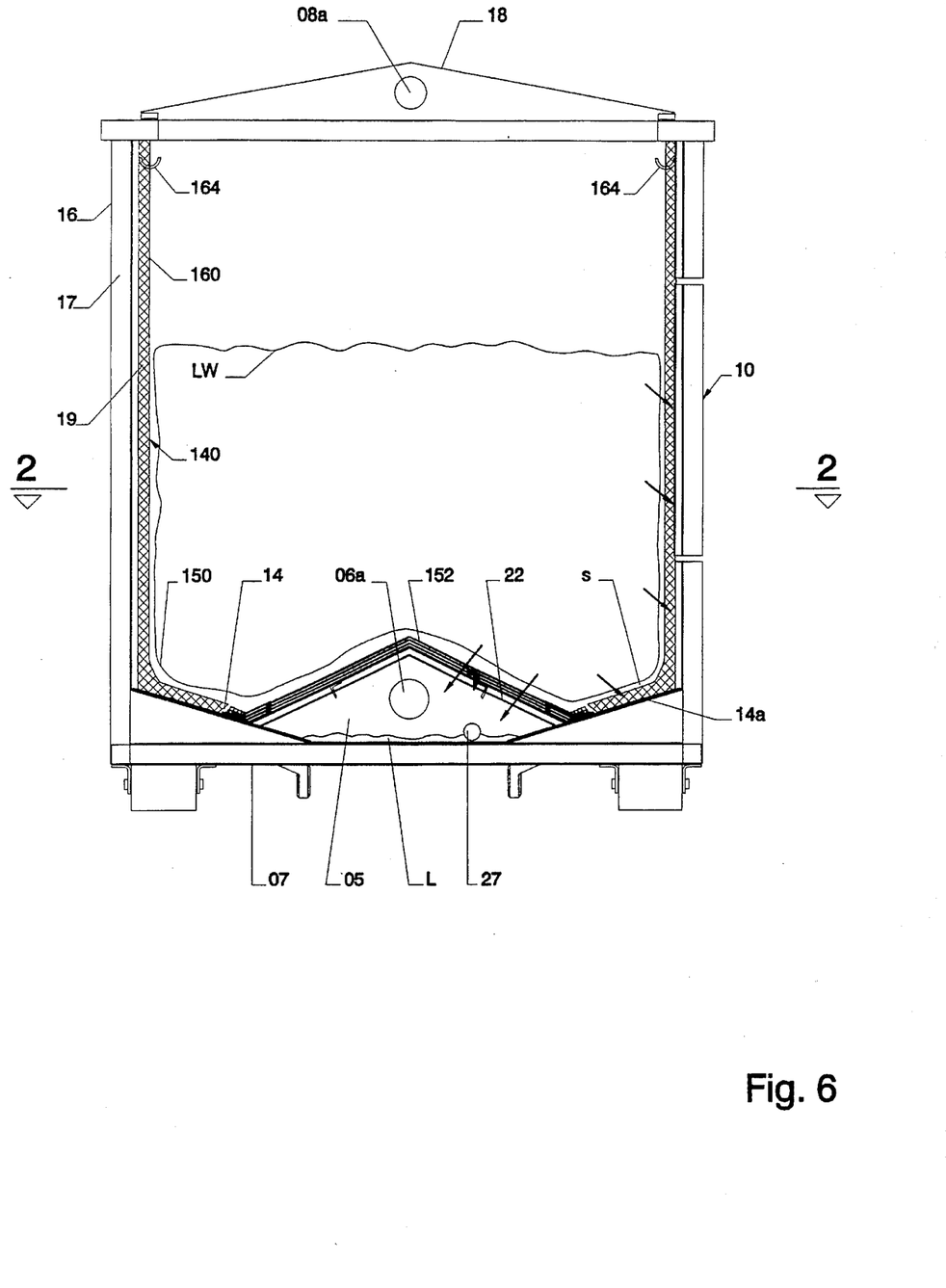
FIG. 6 shows a sectional view of the container equipped with dewatering filter.

To facilitate discharging, the container 10 preferably has a second layer of side walls 19 and 19a, as shown in FIGS. 2 and 6. Second side walls 19 and 19a preferably form a tapered interior within the container 10. The distance between the side walls 19 and 19a increasing from the end wall 11 to the front wall 12. The second side walls 19 and 19a are preferably separated from side walls 16 and 16a by an insulative material 17. The insulative material 17 reduces conductive heat loss between the side walls 16 and 16a, and second side walls 19 and 19a. Insulation 17 prevents freezing of organic waste W to the second side walls 19 and 19a to allow complete removal of organic waste W during cold weather. The preferred insulative material consists of a closed cell foam such as extruded polystyrene with a density of 15 to 25 pounds per cubic feet.

As shown in FIGS. 1, 2 and 3, an uneven aeration floor 26 is positioned over the bottom wall 07 to support organic waste W undergoing decomposition within the container 10. A chamber 05 is defined by the bottom wall 07 and the aeration floor 26. To enhance and augment the growth of thermophilic aerobic bacteria in the organic waste, pressurized air is introduced or drawn into the chamber 05. Air can either enter or leave the chamber 05 through a first orifice 06 in the end wall 11. Alternately, the first orifice can be an orifice 06a in the front wall 12. Air enters with enough force to pressurize the chamber 05 and is then evenly distributed through perforations 24 into the composting organic waste W. Liquid L formed during composting freely drain through the perforations 24 and into the chamber 05. A second orifice 08 through the top of the end wall 11 provides the means for exhausting aeration gases above the composting waste W in the container 10. Alternately, the second orifice can be an orifice 08a through the top of the front wall 12. To reverse the flow of pressurized air, the air can be introduced into the composting waste W through the second orifice 08 and exhausted through the first orifice 06. In another embodiment of the invention, air can be introduced or drawn into the chamber 05 and the upper portion of the container 10 by orifices, not shown, through the bottom wall 07 and the top wall 15.

To enhance uniformity in the temperature gradient throughout the decomposing organic waste W, it is important to minimize the amount of pressurized air following the path of least resistance toward the exhaust orifice 08 or 08a, such as along the enclosing walls, The present invention accomplishes this goal with an uneven aeration floor design that directs air towards the center of the organic waste and away from the enclosing walls. As shown in FIGS. 1, 2 and 3, the aeration floor 26 is comprised of sloping floors 14 and 14a, a perforated false floor 22, end plates 23 and 25 and a vertical wall 29. Preferably, the sloping floors 14 and 14a, perforated false floor 22, end plates 23 and 25 and vertical wall 29 are is constructed from a rigid material, such as stainless steel, polypropylene or high density polyethylene. The sloping floors 14 and 14a extends longitudinally between the end wall 11 and front wall 12 and slope downward from the side walls 16 and 16a toward the center of the bottom wall 07. Preferably the sloping floors 14 and 14a are secured along its length to the side walls 16 and 16a two to sixteen inches above the bottom wall 07 and zero to thirty-six inches from the center of the bottom wall 07. Mounted atop of the sloping floors 14 and 14a is the perforated false floor 22. The perforated false floor 22 has perforations 24 and spans a substantial portion of the distance between the end wall 11 and front wall 12 and between the side walls 16 and 16a. The perforated false floor 22 does not intersect either the side walls 16 or 16a, end wall 11 or front wall 12. This aeration floor 26 configuration directs air away from the path of least resistance along the enclosing walls and encourages the liquid L formed during composting to drain through the perforations 24 into the chamber 05 where it is collected and shielded from saturating the composting waste W. If the composting waste W becomes saturated with the liquid L, air flow through the saturated portions of the composting waste W would be hindered retarding the aerobic process in those portions.

In another embodiment of the invention, not shown, the bottom wall 07 is replaced by the aeration floor 26. The sloping floors 14 and 14a are joined underneath the perforated false floor 22 and forms the bottom of the chamber 05. Alternately, the sloping floors 14 and 14a are joined by another wall to form chamber 05.

The perforated false floor 22 is preferably cross-sectionally curved or peaked to direct air toward the center of the organic waste W and reduce the path pressurized air must travel to reach the center of the composting waste W. The curved or peak floor 22 is preferably spaced a distance 3" to 24" above the bottom wall 07. The perforated false floor 22 is preferably tapered evenly to a narrower cross-section along its length as it approaches the front wall 12. Tapering reduces frictional resistance between the perforated floor 22 and the composted waste W during dumping operations through the front wall 12 reducing possible clogging of the perforations 24. In one embodiment of the invention, as shown in FIG. 3, the perforated false floor 22 consists of removable panels 22a, 22b, 22c, 22d to allow for periodic cleaning and inspection of the chamber 05. The panel 22a closest to the end wall 11 connects to the panel 22b by a brace 35. Likewise, the panel 22b connects to the panel 22c by a brace 35a and the panel 22c connects to the panel 22d by a brace 35b. Moving from the end wall 11 to the front wall 12, the panels are proportionally smaller and the peak height is mounted lower than its predecessor panel.

The perforated false floor 22 is joined at one end by the end plate 25. The end plate 25 abuts the front wall 12 and is secured atop of the sloping floors 14 and 14a, as shown in FIGS. 2 and 3. The vertical wall 29 joins the end plate 25 to close one side of the chamber 05 and to prevent pressurized air from routing up the front wall 12. In the presence of the orifice 06a, both the vertical wall 29 and the front wall 12 have an opening to accommodate the orifice 06a. The perforated false floor 22 is joined at the other end by the end plate 23 which is sealed to the end wall 11 above the first orifice 06. The surfaces of the end plates 23 and 25 preferably assume the same shape as the perforated false floor 22 functioning as an extension of perforated false floor 22.

As mentioned earlier, the aeration floor 26 is designed to encourage liquid L to collect in the chamber 05 during composting. A scoop 28 is provided to contain and decant the collected liquid L and to shield the composted waste W from the liquid L during tilting and dumping operations of the container 10, as shown in FIG. 4. The scoop 28 is comprised of the vertical wall 29 and the end plate 25, as shown in FIG. 3. The vertical plate 29 is sealably joined to the sloping floors 14 and 14a, the bottom wall 07 and the end plate 25. The side of the end plate 25 opposite of the vertical wall 29 remains open to allow liquid L to freely pass into the scoop 28. A drain 27 through the vertical wall 29, as shown in FIG. 6, is provided to decant the liquid L during tilting and dumping operations. Alternately, liquid waste L can be drained through the first orifice 06a. A hose, not shown, may be attached to the drain 27 or the orifice 06a to direct the liquid waste L to a storage tank or sewer drain. Preferably the scoop 28 has an extension plate 25a attached to the end plate 25 which extends beneath the perforated false floor 22 to increase the liquid holding capacity of the scoop 28. Preferably the extension plate 25a is tapered in a manner not obstructing the flow of pressurized air through the perforations 24 above the extension plate 25a. Alternately, liquid L can be removed by suction hose 60, as shown in FIG. 3, contained within the aeration hose 30.

The temperature of the composting waste W within the container 10 provides valuable information for regulating the aerobic decomposition process. The present invention provides such information with a temperature sensitive probe 80, as shown in FIG. 1. The temperature probe 80 is mounted in a manner so it swings down and/or across the container 10. Preferably, the temperature probe 80 is mounted to a hinge 84 which is secured to the upper part of the container 10 so it can swing freely during dumping operations. Preferably the temperature probe 80 has a sensor 82 at its unhinged end positioned 6" to 24" above the aeration floor 26 and a second sensor 86 positioned near its hinged end 12" to 24" below the surface of the composting waste W. The sensors 82 and 86 are made of heat conductive material such as aluminum. Other sensors may be located along the probe 80 to record temperatures at different depths. Alternately, as shown in FIGS. 1 and 2, temperature probes 104 and 106 may be manually inserted into organic waste W through openings 110 and 112 in the enclosing walls 16 or 16a. Temperature probes may also be inserted through the top wall 15 or cover 18. The temperature probes 80, 104 and 106 provide to a processing unit 500 or operator, not shown, a multiple of signals representative of temperatures at a plurality of levels within the organic waste W. Signals from the sensors 82 and 86 are compared to determine the existence of temperature gradients in the composting waste W.

Temperatures gradients are likely to be produced by composting apparatuses utilizing singular aeration flow. As pressurized air moves through the organic waste, the heat and moisture formed during aerobic decomposition are transferred to the pressurized air creating cooler temperatures where the air is introduced and warmer temperatures where the air is exhausted. This creates temperature zones in the composting waste. Aerobic decomposition may be retarded in temperature zones that fall outside the thermophilic temperature range of 40 to 60 degrees Celsius.

Prototype trials have shown that regulating the direction of pressurized. air can facilitate the aerobic process by maintaining more uniform temperature, oxygen and moisture gradients. The present invention allows for hi-directional aeration flow. Aeration flow can be reversed by disconnecting the blower 400 from the first orifice 06 and connecting it to the second orifice 08. Preferably aeration flow is controlled automatically using a reversing damper connected via hoses 30 and 32 to the orifices 06 and 08 as shown on FIG. 10.

Figure 10:
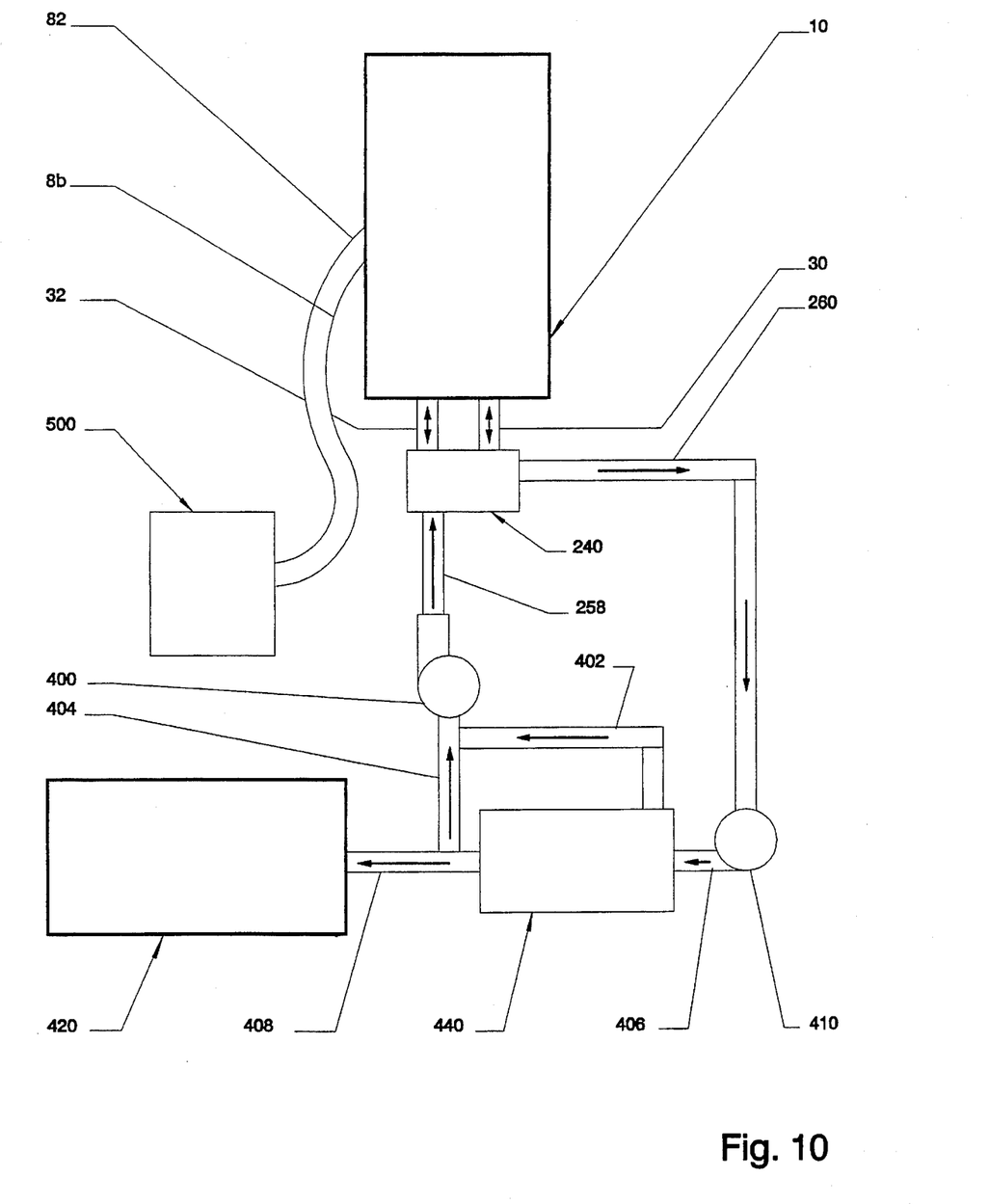
FIG. 10 shows a schematic of the aeration system.

FIG. 10 shows an schematic of the aeration system for container 10. Flexible ducts 30 and 32 connect chamber 06 and orafice 08 respectively to reversing damper 240 or 300. Suction blower 410 is connected to reversing damper 240 or 300 by duct 260. Suction blower 410 pressurizes exhaust air from container 10 through duct 406 and into heat exchanger 440. Pressurized exhuast air passes from heat exchanger 440 into duct 408 then through biofilter 420. Biofilter 420 removes odors from exhaust air prior to venting to the environment. Duct 404 connects to duct 408 to allow a portion of the exhaust air to be recirculated back to container 10. Duct 404 connects to the suction side of pressure blower 400 to duct 408. Heat exchanger 440 transfers heat from exhaust air to fresh air being delivered to container 10. Duct 402 connects the suction side of pressure blower 400 to heat exchanger 440 to draw fresh air through heat exchanger 440. Duct 258 connects pressure blower 400 to reversing damper 240 or 300. Computer controller 500 recieves temperature signals from temperature sensors 82 and 86 and activates blower and damper motors to optimize the composting environment in container 10. Additional sensors not shown for oxygen and moisture can be inserted into container 10 to provide more information to computer 500 on the composting conditions in container 10.

Figure 7:
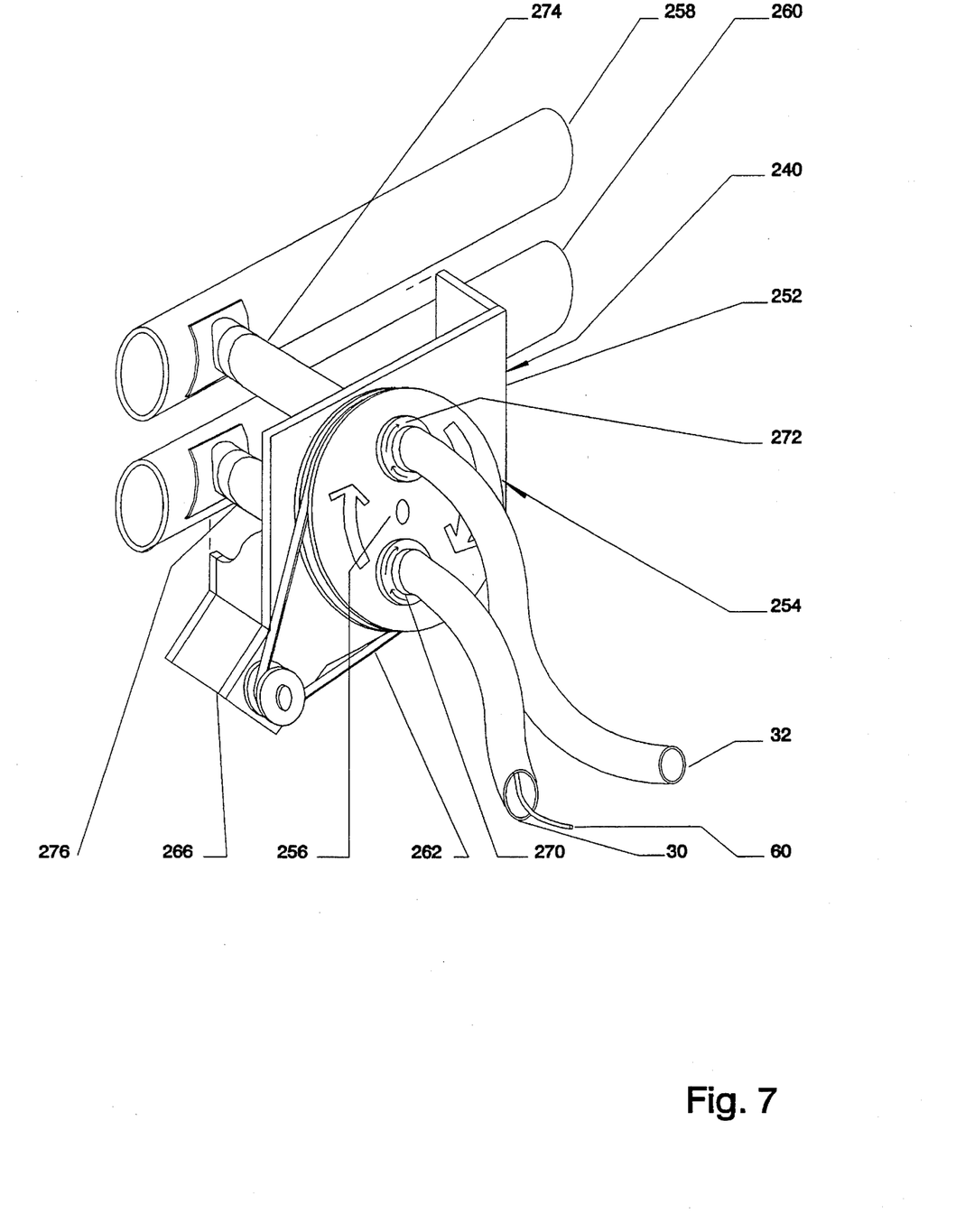
FIG. 7 shows a perspective of a rotating disc damper.
Figure 8:
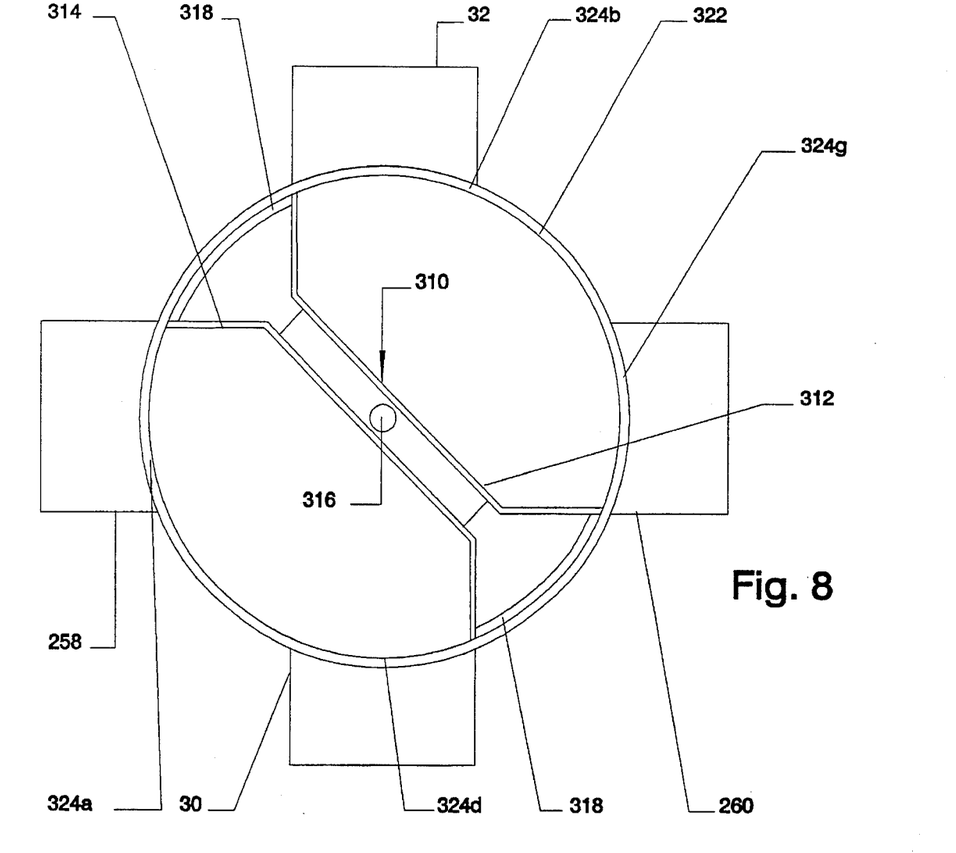
FIG. 8 shows a from elevation of a vane damper.

The rotating damper 240 and vane damper 300 are shown in FIGS. 7 and 8, respectively. The rotating damper 240 is connected to the orifices 06 and 08 by hoses 30 and 32. The rotating damper 240 is comprised of a rotating disk 254, a motor frame 252, ducts 252 and 260, motor 266 and a drive belt 262. The rotating disk 254 is concentrically mounted to the motor frame 252 by a pivot bolt 256. The rotating disk 254 and motor frame 252 each have two openings 180° apart and equi-distance from the pivot bolt 256. The openings in the rotating disk 254 aligns with the openings in the motor frame 252. Hoses 30 and 32 are connected by flanges 270 and 272 to the openings in the rotating disk 254. Flanges 274 and 276 are connect the openings in the motor frame 252 to ducts 258 and 260 respectively. Flanges 274 and 276 align concentrically with flanges 270 and 272 on rotating disk 254 providing pressure and suction air respectively. By rotating disk 254 180 degrees, flange 270 or 272 can be aligned with duct 274 or 276 thereby reversing the direction of air flow in ducts 30 and 32. The motor 266 rotates the disk 254 with the aid of a drive belt 262, reversing the flow of pressurized air within the container 10. The flow of pressurized air to the container 10 can also be halted by rotating disk 254 90 degrees, thereby aligning the openings in the rotating disk 254 with the solid portion of the motor frame 252.

Figure 9:
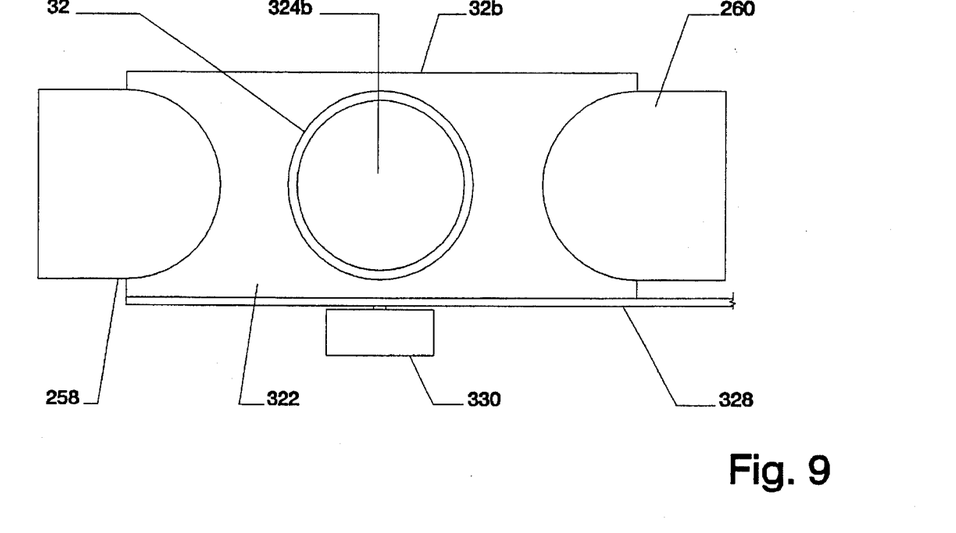
FIG. 9 shows a plan view of a vane damper.

Similar to the previous embodiment is the vane damper 300, as shown in FIGS. 8 and 9. The damper 300 comprises of a circular distribution box 320 and a rotating vane 310. The distribution box 320 has a front panel 326, a back panel 328 and a curved wall 322. The curved wall 322 is secured along the edges of the front panel 326 and back panel 328 and has orifices. 324a, 324b, 324c and 324d. Orifices 324a, 324b, 324c and 324d are arranged 90° apart around the curved wall 322 and are aligned with the duct 258, hose 32, duct 260 and hose 30, respectively. Enclosed snugly within the distribution box 320 is the rotating vane 310 which is comprised of blades 312 and 314 and curved flare ends 318. The blades 312 and 314 are attached to the distribution box 320 by a central pivot shaft 316. The pivot shaft 316 passes through the center of the front panel 326 and back panel 328 attaching the rotating vane 310 concentrically to the distribution box 320. The ends of blades 312 and 314 are bent to form a flare end 318 sufficient to encompass adjacent orifices 324a and 324d and/or adjacent orifices 324b and 324c and block the flow of pressurized air. A motor 330 connected to shaft 316 rotates vane 310 to align it with different orifices and change the direction of pressurized air flow within the container 10 or to block the flow of pressurized air to container 10.

Aeration needs are dictated by the temperature of the organic waste W and the stage of the aerobic process. The preferred aerobic composting process for the present invention consists of four distinct aeration control regimes: the heat-up stage; the maximum heat removal stage; the sterilization stage; and the curing stage. The sterilization stage may come before the maximum heat removal depending on the type of waste to be composted. Each stage has different aeration needs as described below.

The first stage is the heat-up stage. After composting waste W is loaded into the container 10, pressurized air is introduced into it to initiate the aerobic process. Aerobic decomposition will subsequently generate heat raising the temperature of the composting waste W to the thermophilic range of 40 degrees Celsius or higher. Prototype trials revealed that reversing the direction of pressurized air flow cyclically every 15 to 60 minutes while maintaining minimum air flow for oxygen requirements will preserve heat and increase the temperature of the composting waste more rapidly. Reversing aeration flow prevents overcooling in the upper and/or lower portions of the composting waste W while fully oxygenating both the upper and lower portions of the composting waste. Cyclic aeration flow reversal contin- ues until thermophilic temperature is achieved and aerobic thermophilic decomposition initiated throughout the entire pile of the organic waste W. Heat generated in this stage can be recovered from the exhaust air using a heat exchanger 440, to preheat the fresh air entering the container 10. Or exhaust air can be recirculated through duct 404 and mixed with fresh air and blown into the container 10. Temperature measurements at a plurality of levels will signal when the thermophilic temperature has been achieved. Once initiated, it is important to maintain thermophilic temperatures to meet EPA CFR Part 503 regulations and to promote rapid degradation.

The heat generated during composting is a by-product of aerobic decomposition an is therefore representative of the total biological activity in the composting mass. The amount of heat and moisture being removed can be estimated by analyzing the exhaust air volume, moisture content and temperature. Therefore, estimating heat removal by pressurized air provides an accurate indicator of the efficiency of composting. However, excess heat retards the biological activity. It is therefore the goal of the second stage to remove the maximum amount of heat from the composting mass without falling below the thermophilic temperature of 40° degrees Celsius. This will increase the rate of decomposition. Temperature readings in the container 10 are kept below 52 degrees celsuis by providing pressurized air to cool the compost. Heat and moisture will move in the direction of pressurized air flow. In order to maintain even composting conditions, the reversing damper 240 or 300 reverses the direction of the pressurized air flow when there is a difference between temperature sensors 82 and 86 of between 3 and 10 degrees celsuis. The second stage is continuously repeated for one to ten days or until heat production from biological activity is reduced.

As heat travels to the top of the organic waste W, temperature and moisture zones are created. The top zone becomes hotter and moister as the bottom zone cools and drys. Hot air exhausting through the second orifice 08 or 08a carries moisture and heat away from the organic waste W. Heat can be recovered from the exhaust air using the heat exchanger to reduce the cooling effect in the lower zone.

The third stage involves the sterilization to meet the EPA requirements for the Process to Further Reduce Pathogens (PFRP). In this stage, disease causing microbes are destroyed by raising the temperature of the organic waste W to the setpoint temperature according to PFRP standard. In order to provide even temperature stratification throughout the organic waste W to prevent overcooling during the PFRP phase, cyclical reversal of aeration flow is utilized. The duration of the cycle between each aeration flow reversal determines how much cooling will occur. Tests have shown that pressurized air flowing into the container 10 at a rate of 50 cubic feet per minute and being reversed every 10 minutes will result in minimal cooling. If the temperature rises above the setpoint, then the aeration flow is reversed less frequently, e.g., every 15 to 30 minutes, and the aeration volume can be increased. When the average temperature is below the setpoint, aeration volume is lowered to meet minimal oxygen requirement and the aeration flow is reversed more frequently to prevent overcooling. To conserve heat, the heat exchanger can be used to preheat incoming fresh air. An uniform temperature gradient at the PFRP standard is eventually attained throughout the organic waste and maintained for a period of at least three days or as required by regulations for sterilization. Depending on the nature of the material to be composted, the second and third stages can be reversed in order to accomplish PFRP first.

The fourth and final stage is the curing stage. The curing stage further degrades organic waste at lower temperature setpoints. Microbes other than thermophilic bacteria, such as fungi and actinomycetes, are present during curing. Greater differences between the temperature sensors 82 and 86 are allowed during curing prior to reversing damper 240 or 300. Alternately, singular aeration direction can be used during curing. Some wet organic wastes such as sludge may require additional drying during the curing stage. The curing stage removes moisture by utilizing singular aeration flow. The moisture is dried by pressurized air entering either the upper or lower portions of the organic waste W. The moisture gradient develops in the direction of pressurized air flow. Over time the moisture gradient moves through organic waste W and is exhausted through either orifice 06 or 08. The curing stage may last for only a day or may continue for several weeks depending on the amount of moisture present. Curing may also be accomplished outside of the container 10.

An additional stage may be necessary when the organic waste is slurry, such as sludge or wet manure. In such case, a majority of the water must be removed before the organic waste can undergo the heat-up stage of composting. This process is called dewatering. Dewatering generally requires expensive specialized equipment. In another embodiment of the invention, the container 10 can be modified for dewatering, thereby eliminating any additional cost generally associated with purchasing a separate dewatering apparatus.

Turning to FIG. 6, the container 10 is modified to provide for dewatering of liquid wastes LW prior to composting using the filtering system 140. The filtering system 140 is comprised of a drainage net 160 and a filter fabric 150 draped along the interior surfaces and over the aeration floor 26 of the container 10. The drainage net 160 consists of an open mesh or weave material which supports the filter fabric 150 and is preferably fabricated from a non-corrosive material such as polyethylene mesh or stainless steel. The drainage net 160 maintains a gap between the enclosing walls and filter fabric 150 to allow liquid passing through the filter fabric 150 to freely drain to the base of the container 10. The filter fabric 150 consists of a loose woven or spun fabric capable of retaining solids suspended in the liquid waste LW and is preferably a 20 to 300 mesh fabric made of stainless steel, polypropylene or other synthetic fiber. The filter fabric 150, or preferably a separate piece of filter fabric 152, is applied over perforated false floor 22 to allow liquid to drain directly into the Chamber 05. Preferably the filter fabric 152 is disposable and made of an organic fiber capable of degrading during the composting process. This would eliminate the need to remove the liquid waste LW and remove the filter fabric 152 from the container 10 before composting. The filter fabric 150 may also be disposable and biodegradable. Attachment means, such as hooks 164, are provided along the edges of the side walls 16 and 16a and end wall 11 to secure the drainage net 160 and filter fabric 150 against the side walls 16 and 16a. The container 10 can also have grooves, not shown, for securing the filtering system 140 against the walls of container 10. Additionally, an electrical conductor, not shown, can be attached to the perforated floor 22 to encourage the consolidation and densification of solids against the filter fabric 150 and the flow of liquid through the perforations 24 by the process of electro-phoresis or electroosmosis.

As the liquid waste LW is loaded into the container 10, gravity begins to force the sludge through the filter fabric 150, leaving the solids inside the container 10. Liquid L drains down the drainage net 160 and into the chamber 05. Liquid L also drains directly through the filter fabric 150 or 152 and through the perforations 24 into the chamber 05. Liquid is discharged from the chamber 05 through the orifice 06a or drain 27 to an appropriate disposal means. The sludge solids may continue to drain for a period of several days in the container 10 until the remaining sludge solids are in a range of 10% to 35% solids by weight.

In view of the foregoing, it may be seen that the objects of the present invention have been achieved and other advantageous results have been attained.

As various modifications could be made in the above described construction of the invention without departing from the scope of the invention, it should be understood that all matter contained in the description or accompanying drawings shall be interpreted as illustrative and not in a limiting sense.

I claim:

1. An apparatus utilizing pressurized air for composting organic waste comprising of:
   a. a container for holding said organic waste having a bottom wall and enclosing walls about said bottom wall;
   b. an uneven aeration floor within said container positioned above said bottom wall for supporting said organic waste and forming a chamber with said enclosing walls and said bottom wall, wherein said uneven aeration floor is a perforated floor having a surface shape which is peaked upwardly toward center of said container; and
   c. a first air passage means for allowing air to be introduced into or exhausted from said chamber, wherein said first air passage means is an orifice positioned below said uneven aeration floor through said container.

2. The apparatus utilizing pressurized air for composting organic waste as recited in claim 1 further comprising of:
   d. a top wall positioned atop of said enclosing walls for enclosing said container; and
   e. a second air passage means for allowing air to be exhausted from or introduced into said container above said uneven perforated aeration floor.

3. The apparatus utilizing pressurized air for composting organic waste as recited in claim 2 wherein said top wall is removable.

4. The apparatus utilizing pressurized air for composting organic waste as recited in claim 2 further comprising of:
   f. a reversing damper connected to said container at said first air passage means and said second air passage means for controlling the direction of said pressurized air travelling through said container.

5. The apparatus utilizing pressurized air for composting organic waste as recited in claim 4 further comprising of:
   g. a scoop positioned within said chamber for collecting and decanting liquid formed during composting of said organic waste.

6. The apparatus utilizing pressurized air for composting organic waste as recited in claim 1 further comprising of:
   d. a scoop positioned within said chamber for collecting and decanting liquid formed during composting of said organic waste.

7. The apparatus utilizing pressurized air for composting organic waste as recited in claim 1 wherein said uneven perforated aeration floor has a raised perforated center portion and solid outer portions, said solid outer portions are secured to said enclosing walls and to said bottom wall, said outer portions slope downward from said enclosing walls toward said bottom wall, said raised perforated center portion is mounted atop of said solid outer portions.

8. The apparatus utilizing pressurized air for composting organic waste as recited in claim 1 wherein said enclosing walls comprise of side walls, a front wall and an end wall and wherein said uneven perforated aeration floor comprises of a first sloping floor, a second sloping floor, a first end plate, a second end plate and a perforated center floor, said first sloping floor intersects one of said side walls, said bottom wall, said end wall and said front wall, said second sloping floor intersects opposite said side wall, said bottom wall, said end wall and said from wall, said first end plate is secured atop of said first and second sloping floors and intersects said end wall, said second end plate is secured atop of said first and second sloping floors and intersects said front wall, said perforated center floor is secured atop of said first and second sloping floors and to said first and second end plates, said perforated center floor forms a chamber with said bottom wall, said first and second sloping floors, said first and second end plates, said end wall and said front wall.

9. The apparatus utilizing pressurized air for composting organic waste as recited in claim 8 further comprising of:
  d. a top wall positioned atop of said enclosing walls for enclosing said container; and
  e. a second air passage means for allowing air to be exhausted from or introduced into said container above said uneven perforated aeration floor.

10. The apparatus utilizing pressurized air for composting organic waste as recited in claim 1 wherein said enclosing walls comprise of side walls, an end wall and a front wall detachably connected to said side walls and wherein said uneven perforated aeration floor comprises of a first sloping floor, a second sloping floor, a first end plate, a second end plate and a perforated center floor, said first sloping floor intersects one of said side walls, said bottom wall, said end wall and said front wall, said second sloping floor intersects opposite said side wall, said bottom wall, said end wall and said front wall, said first end plate is secured atop of said first and second sloping floors and intersects said end wall, said second end plate is secured atop of said first and second sloping floors and intersects said front wall, said perforated center floor is secured atop of said first and second sloping floors and to said first and second end plates, said perforated center floor forms a chamber with said bottom wall, said first and second sloping floors, said first and second end plates, said end wall and said front wall.

11. The apparatus utilizing pressurized air for composting organic waste as recited in claim 10 further comprising of:
  d. a scoop positioned within said chamber toward said front wall for collecting and decanting liquid. formed during composting of said organic waste.

12. An apparatus utilizing pressurized air for composting organic waste comprising of:
  a. a solid bottom portion;
  b. a cross-sectionally raised perforated upper portion mounted atop of said solid bottom portion and forming a chamber with said solid bottom portion, wherein said cross-sectionally raised perforated upper portion has a surface shape which is peaked upwardly; and
  c. a first air passage means for allowing air to be introduced into or exhausted from said chamber.

13. The apparatus utilizing pressurized air for composting organic waste as recited in claim 12 further comprising of:
  d. a container for enclosing said cross-sectionally raised perforated upper portion and containing said organic waste, said container having said side walls, a front wall and an end wall which intersects with said solid bottom portion of said cross-sectionally raised perforated upper portion.

14. The apparatus utilizing pressurized air for composting organic waste as recited in claim 13 further comprising of:
  e. a top wall secured atop of said enclosing walls for enclosing said container; and
  f. a second air passage means for allowing air to be exhausted from or introduced into said container above said cross-sectionally raised perforated upper portion.

15. The apparatus utilzing pressurized air for composting organic waste as recited in claim 14 wherein said front wall is detachably connected to said side walls.

16. The apparatus utilzing pressurized air for composting organic waste as recited in claim 15 further comprising of:
  g. a scoop positioned within said chamber for collecting and decanting liquid formed during composting of said organic waste.

17. An apparatus for composting liquid organic waste adaptable for use with a dewatering system comprising of:
  a. a container for holding said liquid organic waste having a bottom wall and enclosing walls about said bottom wall;
  b. an uneven aeration floor within said container positioned above said bottom wall for supporting said liquid organic waste and forming a chamber with said enclosing walls and said bottom wall, wherein said uneven aeration floor is a perforated floor having a surface shape which is peaked upwardly toward center of said container; and
  c. a first air passage means for allowing air to be introduced into or exhausted from said chamber, wherein said first air passage means is an orifice positioned below said uneven aeration floor through said container; and
  d. attachment means for securing said dewatering system along said enclosing walls of said container.

18. The apparatus for composting liquid organic waste adaptable for use with a dewatering system as recited in claim 17 further comprising of:
  e. a dewatering system secured to said enclosing walls by said attachment means, said dewatering system having a filter fabric and a drainage net, said filter fabric capable of allowing liquid to pass through while retaining solids in said liquid organic waste, said drainage net interposed between said enclosing walls and said filter fabric to allow liquid passing through said filter fabric to freely drain along said enclosing walls.

19. The apparatus for composting liquid organic waste adaptable for use with a dewatering system as recited in claim 17 further comprising of:
  e. a scoop positioned within said chamber for decanting liquid collected during dewatering and formed during composting of liquid organic waste.

* * * * *